July 10, 1956 A. COTSWORTH III 2,754,359

AUTOMATIC GAIN-CONTROL CIRCUIT

Filed Sept. 26, 1950 2 Sheets-Sheet 1

INVENTOR.

ALBERT COTSWORTH III

BY Francis W. Crotty

HIS ATTORNEY

July 10, 1956 A. COTSWORTH III 2,754,359

AUTOMATIC GAIN-CONTROL CIRCUIT

Filed Sept. 26, 1950 2 Sheets-Sheet 2

INVENTOR.
ALBERT COTSWORTH III
BY Francis W. Crotty
HIS ATTORNEY

United States Patent Office 2,754,359

Patented July 10, 1956

2,754,359

AUTOMATIC GAIN-CONTROL CIRCUIT

Albert Cotsworth III, Oak Park, Ill., assignor to Zenith Radio Corporation, a corporation of Illinois Application September 26, 1950, Serial No. 186,833

2 Claims. (Cl. 178—7.5)

Figure 1:
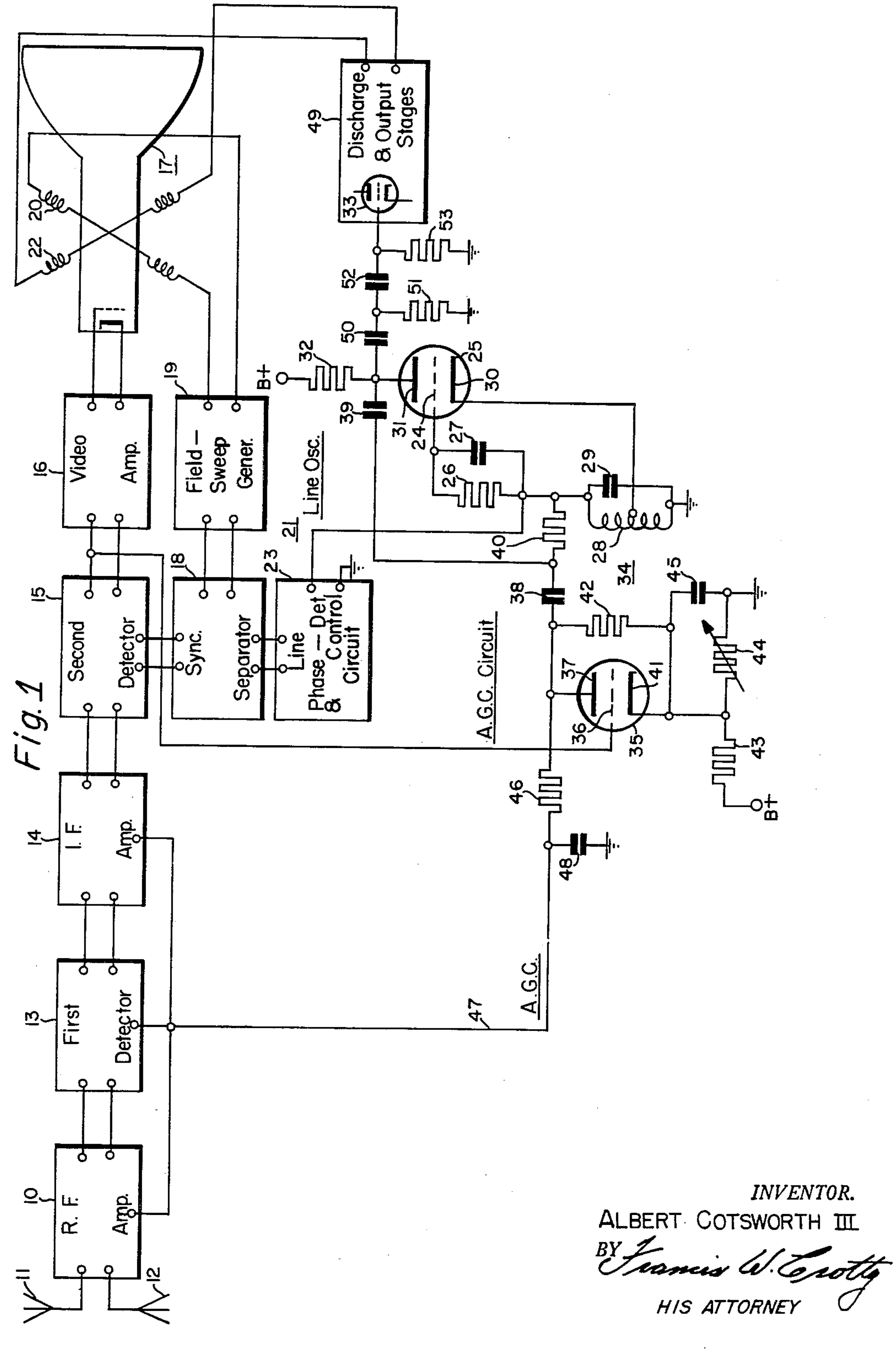

This invention relates to gain-control circuits for use in television receivers or the like to control the gain of such receivers automatically in accordance with the amplitude characteristics of received television signals.

One type of automatic gain-control circuit heretofore proposed is disclosed in copending application Serial No. 39,368, filed July 17, 1948, and issued April 15, 1952, as Patent 2,593,011, entitled "Automatic Gain Control Circuit for Television Receivers" by Albert Cotsworth III and assigned to the present assignee. The circuit disclosed in this copending application utilizes the synchronizing components of a received television signal to derive a gain-control potential and is rendered sensitive only during recurring intervals corresponding to the intervals of the synchronizing components of the received signal. This is accomplished by deriving a gating signal from the line-sweep system of the receiver and utilizing this signal to excite an electron-discharge device in the automatic gain-control circuit. When such a circuit is used in a television receiver, the gain-control potential developed thereby is substantially independent of noise disturbances, and the like, occurring during line-trace intervals because the control circuit is rendered insensitive during such latter intervals by the gating signal.

Usually, the gating signal for an automatic gain-control stage of the type under consideration is derived from the synchronized oscillator in the line-sweep system. This oscillator is usually synchronized with the line-synchronizing components of a received television signal by means of a phase detector and frequency-control circuit. In most such line-sweep systems a phase displacement inherently exists between the output signal of the synchronized oscillator and the incoming line-synchronizing components. Since for proper gating action the gating signal applied to the automatic gain-control circuit must occur in time coincidence with the line-synchronizing components, it is necessary to incorporate some type of phase-shifting network between the synchronized oscillator and the gain-control circuit.

The synchronized oscillator stage of conventional line-sweep systems sometimes takes the form of a triode with a frequency-determining network coupled between its control electrode and cathode. The oscillator is so constructed that it develops a periodic wave signal, usually in the form of a sine wave, at its control electrode and a dissimilar periodic wave signal at its anode. The latter signal is differentiated and applied to the discharge and output stages of the line-sweep system to control the operation of these stages in synchronism with the incoming synchronizing components.

As described in the aforementioned copending application, the anode of the electron-discharge device or control tube of the gain-control circuit is coupled to either the anode or control electrode of the synchronized oscillator through a phase-shifting network so that one or the other of the periodic wave signals developed by the oscillator is utilized as an excitation potential for the control tube for gating purposes. It has been found that when the control tube is coupled to the anode of the oscillator through a phase-shifting network, the signal obtained therefrom may have sufficient amplitude to accomplish gating of the control tube, but the waveform of that signal is insufficiently sharp to provide the extremely narrow gating action which is desired for optimum noise discrimination. On the other hand, when the control tube is coupled to the control electrode of the synchronized oscillator, unless an expensive inductance type phase-shifting nework is used, the signal derived from the oscillator has insufficient amplitude upon translation through the phase-shifting network to provide a high degree of excitation for the control tube and the desired degree of amplification of the gain-control signal developed thereby.

It is, accordingly, an object of this invention to provide an improved gain-control circuit for utilizing the synchronizing components of a received television signal to develop a gain-control signal, which is sensitized solely during intervals corresponding to the synchronizing components of the received television signal so as to be substantially immune to the effect of noise disturbances and the like received concurrently therewith.

A further object of this invention is to provide an improved gain-control circuit which includes a simple network for impressing a gating signal thereon appropriately phased and having a suitable waveform to render the circuit sensitive solely during the synchronizing intervals of the received television signal.

Accordingly, the invention is directed to an automatic gain-control system for a television receiver utilizing a negatively-modulated television signal including recurring synchronizing components. An AGC system constructed in accordance with the invention comprises an oscillation generator which is synchronized by the received synchronizing components and which includes first and second output terminals. The oscillation generator develops a first periodic signal of sinusoidal waveform at the first output terminal and concurrently amplifies and inverts that first periodic signal to develop at the second terminal a second periodic signal of harmonically distorted waveform equal in fundamental frequency to the first signal. The system further includes an electron-discharge device normally biased to anode-current cut-off, a load impedance connected to that device, and means for applying the received television signal to that device so that the synchronizing components of the received signal tend to render the device conductive. An alternating-current coupling circuit is utilized to couple the output terminals of the oscillation generator to the electron-discharge device to apply thereto a gating signal and effect conduction in the device only during intervals substantially corresponding to the synchronizing components of the received television signal. This coupling circuit includes first and second branch networks individually coupled to the output terminals of the oscillation generator to combine the first and second periodic signals and develop the required gating signal; the second branch network comprises means for differentiating the aforesaid second periodic signal. A gain-control potential is derived from the system by circuit means connected to the load impedance of the electron-discharge device, this potential being determined by the conduction of that device.

Figure 2:
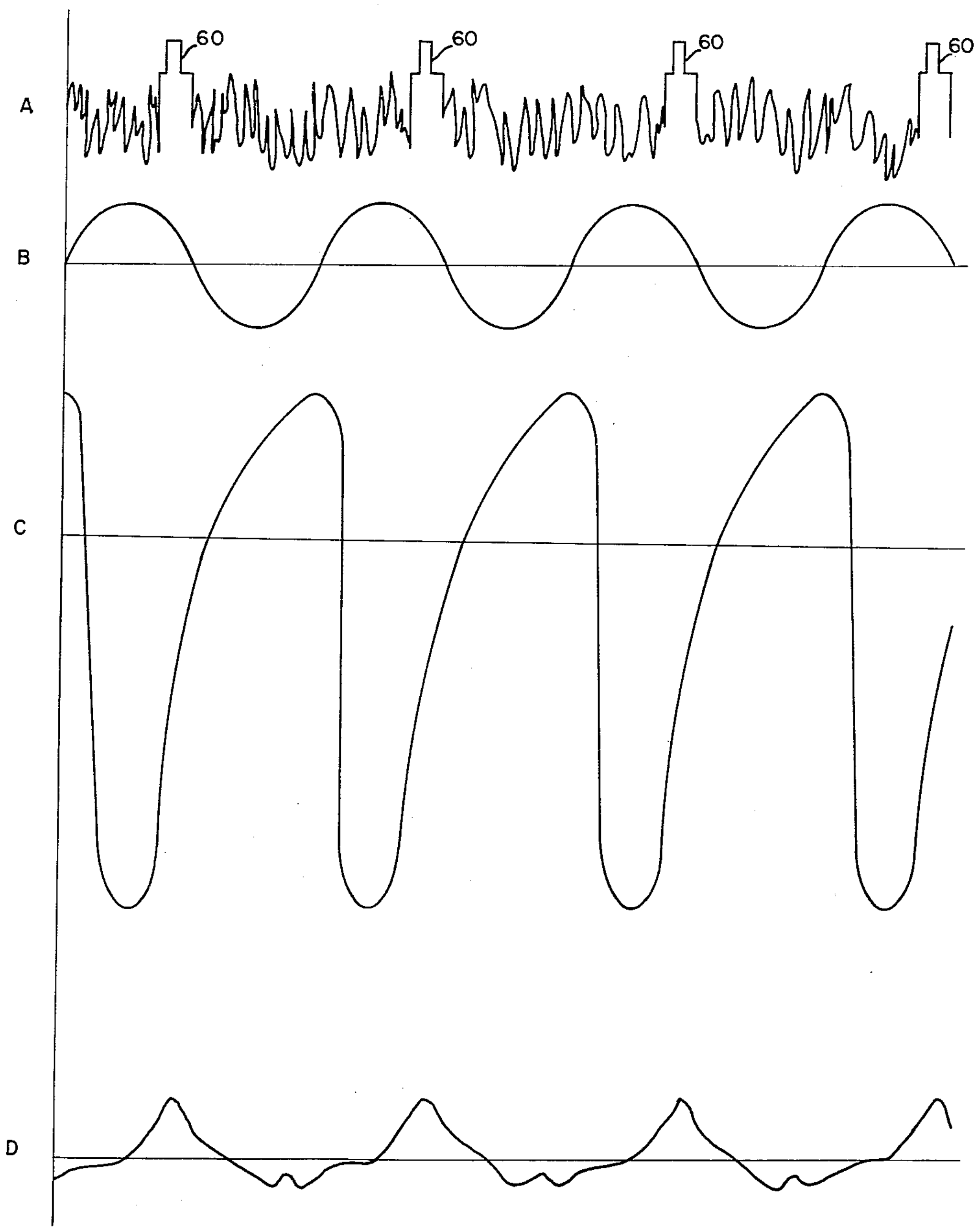

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a television receiver incorporating the gain-control circuit of the invention, and Figure 2 comprises various curves indicating the composition of the gating signal applied to the control circuit.

The television receiver illustrated in Figure 1 includes a radio-frequency amplifier 10 of any desired number of stages, the input terminals of which may be connected to any suitable antenna circuit 11, 12. The output terminals of amplifier 10 are connected to a first detector 13 which, in turn, is coupled to an intermediate-frequency amplifier 14 of one or more stages. The output terminals of intermediate-frequency amplifier 14 are connected to a second detector 15 whose output terminals are connected through a video amplifier 16 to the input electrodes of an image-reproducing device 17. Second detector 15 is also connected to a synchronizing-signal separator 18 which is connected to a field-sweep generator 19, generator 19 being coupled to field-deflection elements 20 associated with device 17. Synchronizing-signal separator 18 is also connected to a line-sweep system 21 which is coupled to line-deflection elements 22 of device 17.

The receiver as thus far described may be tuned to utilize a negatively-modulated television signal intercepted by antenna circuit 11, 12. This signal is amplified in radio-frequency amplifier 10 and heterodyned to the selected intermediate-frequency of the receiver in first detector 13. The resulting intermediate-frequency signal is implified in amplifier 14 and detected in second detector 15 to produce a composite video signal. The composite video signal is amplified in amplifier 16 and applied to the input electrodes of device 17 to control the intensity of the cathode-ray beam developed therein in well-known manner.

The synchronizing components of the composite video signal are separated therefrom in synchronizing-signal separator 18, the field-synchronizing components being utilized to control the operation of field-sweep generator 19 and the line-synchronizing components to control the operation of line-sweep system 21. Field-sweep generator 19 and line-sweep system 21 apply field- and line-deflection signals to elements 20, 22 respectively to cause the cathode-ray beam to be scanned over the screen of device 17 in well-known fashion. In this manner, image-reproducing device 17 reproduces the picture intelligence contained by the received television signal. The portion of the receiver utilized for the reproduction of sound intelligence of the received signal forms no part of the present invention and for that reason is not shown.

Line-sweep system 21 may include a phase detector and a frequency-control circuit 23 having its output terminals connected respectively to ground and to a control electrode 24 of an electron-discharge device 25 through the parallel combination of a resistor 26 and a capacitor 27. The junction of the output terminal of stage 23 and network 26, 27 is connected to ground through a frequency-determining network comprising an inductance coil 28 shunted by a capacitor 29. Cathode 30 of device 25 is connected to a tap on inductance coil 28, and anode 31 of this device is connected to the positive terminal B+ of a source of unidirectional potential through a load resistor 32. Anode 31 is further coupled to discharge tube 33 of discharge and output stages 49 through a differentiating network comprising series capacitor 50 and shunt resistor 51, and through a coupling network comprising series capacitor 52 and shunt resistor 53. The output terminals of unit 49 are connected to the line-deflection elements 22 of device 17.

The afore-described line-sweep system is well-known to the art. Unit 23 develops a frequency-control signal having characteristic variations indicating phase displacements between the incoming line-synchronizing components and the signal developed by the oscillator comprising device 25. The frequency-determining network 28, 29 of the oscillator is tuned to establish a free-running frequency substantially equal to the repetition frequency of the incoming synchronizing components. The frequency of the oscillator is controlled by the frequency-control signal developed by unit 23 to be synchronous with the line-synchronizing components. The oscillator develops a periodic wave signal at its control electrode 24 such as shown in curve B of Figure 2. The signal of curve B is synchronized with the line-synchronizing components 60 of a received television signal illustrated in curve A, but displaced in phase relative thereto (as shown). Device 25 develops a periodic wave signal as shown in curve C in its anode circuit, which is similarly displaced in phase from the synchronizing components 60 of curve A. As is usual in triode circuits, the anode wave of curve C is 180° out of phase with the control-electrode wave of curve B. Moreover, due to a non-linear characteristic of device 25 and to the characteristics of the circuitry coupled to its anode, the wave of curve C also suffers a distortion and has the illustrated wave-form instead of a pure sine wave. The latter wave is applied through differentiating network 50, 51 and coupling network 52, 53 to discharge tube 33 to synchronize the discharge and output stages 49 with the synchronizing components of the received television signal.

Automatic gain control for the television receiver is provided by means of a circuit 34 which comprises control tube 35 having a control electrode 36 connected to second detector 15. It is to be understood that control electrode 36 may be connected to intermediate-frequency amplifier 14 or to certain stages of video amplifier 16, the purpose of this connection being to apply the received television signal to the control tube so that the synchronizing components thereof may be utilized for gain control purposes. Anode 37 of device 35 is coupled to anode 31 of oscillator 25 through series-connected capacitors 38, 39; and to control electrode 24 of device 25 through capacitor 38, a resistor 40, and shunt-connected resistor 26 and capacitor 27. Elements 38, 39 and 40 are connected to form an alternating-current coupling circuit extending from the anode and cathode of control tube 35 to oscillator 25. The coupling circuit has a pair of branch networks respectively including resistor 40 and capacitor 39. Anode 37 is further connected to cathode 41 of device 35 through a resistor 42 which acts as a load impedance for the control signal developed by circuit 34. Cathode 41 is connected to the junction of a pair of resistors 43 and 44, which are connected as a potentiometer between the positive terminal B+ of a source of unidirectional potential and ground. Resistor 44 is variable and is shunted by a capacitor 45. Anode 37 is further connected to the various controlled stages of the receiver through a resistor 46 by way of a lead 47, the terminal of resistor 46 remote from anode 37 being coupled to ground by means of a capacitor 48.

The periodic wave signal developed at anode 31 of the oscillator (as shown in curve C of Figure 2) is applied to anode 37 of control device 35 through capacitor 39 and capacitor 38; whereas the signal developed at control electrode 24 of the oscillator (as shown in curve B) is applied to anode 37 through resistor 40 and capacitor 38. Due to the effect of capacitor 39 which may be considered a phasing impedance, the first-mentioned signal undergoes a phase shift relative to the last-mentioned signal, and the composite signal applied to anode 37 has a wave form as shown in curve D of Figure 2. The parameters of the various elements comprising network 38, 39 and 38, 40 are so selected that the composite signal has peaked portions in phase with the line-synchronizing components 60 of curve A, and this signal provides a sufficiently high potential to anode 37 during the intervals of these components to enable control tube 35 to translate the gain control signal with the required degree of amplification. Moreover, the peaked portions of the wave of curve D are sufficiently sharp so that control tube 35 is capable of conduction only during intervals corresponding to the synchronizing components. In the video signal as applied to control electrode 36, the synchronizing components extend in a positive direction and cooperate with the gating signal to render device 35 conductive only during the synchronizing signal intervals. During all other intervals, device 35 is non-conductive due to the positive bias applied to cathode 41 from potentiometer 43, 44.

A unidirectional potential of negative polarity is developed across resistor 42, due to the conduction of device 35, and its amplitude variations correspond to variations in amplitude of the synchronizing components of the received television signal. Network 46, 48 acts as a filter to remove the gating signal from the automatic gain-control lead 47 over which solely the unidirectional potential developed across resistor 42 is supplied to the various controlled stages of the receiver to achieve automatic gain control. Resistor 42 is returned to positive cathode 41, rather than to ground, so that in the presence of weak television signals the potential of lead 47 is slightly positive to overcome the negative potential impressed on this lead by first detector 13. This negative potential is produced by the first detector due to the fact that the heterodyne oscillator stage of the receiver sometimes drives the control electrode of the first detector positive in the presence of weak television signals. This action of the first detector is fully explained and compensating networks therefor are disclosed and claimed in copending application Serial No. 134,410 entitled "Automatic Gain Control Circuit" filed December 22, 1949, in the name of Albert Cotsworth III, now U. S. Patent No. 2,635,184, issued April 14, 1953, and assigned to the present assignee.

The gating circuit of this invention derives a composite signal from oscillator 25 having sufficient amplitude to enable control tube 35 to develop a satisfactory control signal, and having a waveform sufficiently sharp that the control tube is energized solely during intervals corresponding substantially to the confines of the synchronizing intervals of the received signal, thus rendering the circuit relatively immune to noise disturbances and the like. This gating signal is obtained by means of a simple resistance-capacitance network 38, 39, 40 coupled to both the control electrode and anode of the oscillator 25.

In a constructed embodiment of the invention the following parameters were used to achieve highly satisfactory results. These parameters are listed herein merely by way of example and are not intended to limit the invention in any way.

| | |
|---|---|
| Device 25 | ½ 6SN7. |
| Resistor 26 | 100,000 ohms. |
| Capacitor 27 | .001 microfarad. |
| Resistor 32 | 33,000 ohms. |
| B+ | 360 volts. |
| Device 35 | ½ 6SN7. |
| Capacitor 38 | .002 microfarad. |
| Capacitor 39 | 33 micromicrofarads. |
| Resistor 40 | 47,000 ohms. |
| Resistor 42 | 1 megohm. |
| Resistor 43 | 100,000 ohms. |
| Resistor 44 | 0–4,000 ohms. |
| Capacitor 45 | .001 microfarad. |
| Resistor 46 | 470,000 ohms. |
| Capacitor 48 | .1 microfarad. |
| Capacitor 50 | 150 micromicrofarads. |
| Resistor 51 | 18,000 ohms. |
| Capacitor 52 | .01 microfarad. |
| Resistor 53 | 1 megohm. |

While a particular embodiment of the invention has been shown and described, modifications may be made and it is intended in the appended claims to cover all such modifications as fall within the true spirit and scope of the invention.

I claim:

1. An automatic gain-control system for a television receiver utilizing a negatively-modulated television signal including recurring synchronizing components comprising: an oscillation generator, synchronized by said synchronizing components and including first and second output terminals, said oscillation generator including means for generating a first periodic signal of sinusoidal waveform at said first terminal and for concurrently amplifying and inverting said first periodic signal to develop a second periodic signal of harmonically distorted waveform equal in fundamental frequency to said first signal at said second terminal; an electron-discharge device normally biased to anode-current cut-off; a load impedance connected to said device; means for applying said television signal to said device so that said synchronizing components tend to render said device conductive; an alternating-current coupling circuit, coupling said output terminals of said oscillation generator to said device, for applying a gating signal to said device to effect conduction in said device only during intervals substantially corresponding to said synchronizing components, said coupling circuit including first and second branch networks individually coupled to said output terminals of said generator for combining said first and second periodic signals to develop said gating signal, said second branch network comprising means for differentiating said second periodic signal; and means connected to said load impedance for deriving a gain-control determined by the conduction of said device.

2. An automatic gain-control system for a television receiver utilizing a negatively-modulated television signal including recurring synchronizing components comprising: an oscillation generator, synchronized by said synchronizing components and including a electro-discharge device having anode, cathode and control electrodes and further including means comprising a frequency-determining network connected to said electrodes for generating a first periodic signal of sinusoidal waveform at a first one of said electrodes and for concurrently amplifying and inverting said first periodic signal to develop a second periodic signal of harmonically distorted waveform signal in fundamental frequency to said first signal at a second one of said electrodes; a control tube normally biased to anode-current cut-off; a load impedance connected to said control tube; means for applying said television signal to said control tube so that said synchronizing components tend to render said tube conductive; an alternating-current coupling circuit, coupling said first and second electrodes of said oscillation generator to said control tube, for applying a gating signal to said tube to effect conduction therein only during intervals substantially corresponding to said synchronizing components, said coupling circuit including first and second branch networks individually coupled to said first and second electrodes of said oscillation generator device for combining said first and second periodic signals to develop said gating signal, said second branch network comprising means for differentiating said second periodic signal; and means connected to said load impedance for deriving a gain-control potential determined by the conduction of said control tube.

References Cited in the file of this patent

UNITED STATES PATENTS

| | | |
|---|---|---|
| 2,538,519 | Holst | Jan. 16, 1951 |
| 2,615,089 | Roger | Oct. 21, 1952 |

FOREIGN PATENTS

| | | |
|---|---|---|
| 851,899 | France | Jan. 16, 1940 |

OTHER REFERENCES

Rider's Television Manual, vol. 4, Zenith TV, page 4–43 (Zenith Ch. 23G24).